United States Patent [19]
Fife et al.

[11] Patent Number: 5,261,942
[45] Date of Patent: Nov. 16, 1993

[54] TANTALUM POWDER AND METHOD OF MAKING SAME

[75] Inventors: James A. Fife, Douglessville; Marlyn F. Getz, Barto, both of Pa.

[73] Assignee: Cabot Corporation, Boston, Mass.

[21] Appl. No.: 849,994

[22] Filed: Mar. 10, 1992

Related U.S. Application Data

[60] Continuation of Ser. No. 462,806, Jan. 10, 1990, abandoned, which is a division of Ser. No. 209,746, Jun. 21, 1988, Pat. No. 4,940,490, and a continuation-in-part of Ser. No. 126,706, Nov. 30, 1987, abandoned.

[51] Int. Cl.⁵ .............................................. B22F 9/04
[52] U.S. Cl. ................................... 75/342; 75/343; 75/365
[58] Field of Search ............... 75/314, 342, 343, 365, 75/622, 255

[56] References Cited

U.S. PATENT DOCUMENTS

| | | | |
|---|---|---|---|
| 4,486,225 | 12/1984 | Osborne et al. | 75/361 |
| 4,555,268 | 11/1985 | Getz | 75/229 |
| 4,705,560 | 11/1987 | Kemp et al. | 75/342 |

*Primary Examiner*—George Wyszomerski
*Attorney, Agent, or Firm*—David J. Koris

[57] ABSTRACT

An improved flaked tantalum powder and process for making the flaked powder are disclosed. The powder is characterized by having a Scott density greater than about 18 g/in$^3$ and preferably at least about 90% of the flake particles having no dimension greater than about 55 micrometers. Agglomerates of the flaked tantalum powder, provide improved flowability, green strength and pressing characteristics compared to conventional flaked tantalum powders. The improved flaked tantalum powder can be made by preparing a flaked tantalum and then reducing the flake size until a Scott density greater than about 18 g/in$^3$ is achieved. The invention also provides pellets and capacitors prepared from the abovedescribed flaked tantalum powder.

24 Claims, 13 Drawing Sheets

1000X Magnification

1000X Magnification

CONVENTIONAL TANTALUM FLAKE

1000X Magnification

FRACTURED TANTALUM FLAKE (INVENTION)(PRIOR ART)

(INVENTION)(PRIOR ART)

(INVENTION)(PRIOR ART)

(INVENTION)(PRIOR ART)

TANTALUM POWDER AND METHOD OF MAKING SAME

CROSS REFERENCE TO RELATED APPLICATION

This is a continuation of application Ser. No. 07/462,806 filed on Jan. 10, 1990, abandoned, which is a division of application Ser. No. 07/209,746 filed Jun. 21, 1988, now U.S. Pat. No. 4,940,490 and a continuation-in-part of U.S. patent application Ser. No. 126,706, filed Nov. 30, 1987, now abandoned.

FIELD OF INVENTION

The invention relates to flaked tantalum powders often used for electrical capacitors and methods for making such powders. More particularly, the invention relates to flaked tantalum powders which when agglomerated provide the required electrical properties and good processing properties, e.g., flowability, high green strength and pressability.

BACKGROUND OF THE INVENTION

Tantalum capacitors, made from tantalum powder, have been a major contributor to the miniaturization of electronic is circuits and have made possible the application of such circuits in extreme environments. Tantalum capacitors typically are manufactured by compressing agglomerated tantalum powder to form a pellet, sintering the pellet in a furnace to form a porous tantalum body (electrode), and then subjecting the porous body to anodization in a suitable electrolyte to form a continuous dielectric oxide film on the sintered body.

Development of powders suitable for making tantalum capacitors has resulted from efforts by both capacitor producers and tantalum processors to delineate the characteristics required for tantalum powder in order for it to best serve in the production of quality capacitors. Such characteristics include surface area, purity, shrinkage, pressability, green strength, and flowability.

First of all, the powder should provide an adequate surface area when formed into a porous body and sintered. The $\mu fV/g$ of tantalum capacitors is proportional to the specific surface area of the sintered porous body produced by sintering a tantalum powder pellet; the greater the specific surface area after sintering, the greater the $\mu fV/g$. The specific surface area of tantalum powder is related to the maximum $\mu fV/g$ attainable in the sintered porous body.

Purity of the powder is an important consideration. Metallic and non-metallic contamination tends to degrade the dielectric oxide film in tantalum capacitors. While high sintering temperatures serve to remove some volatile contaminants high temperatures tend to shrink the porous body reducing its net specific surface area and thus the capacitance of the resulting capacitor. Minimizing the loss of specific surface area under sintering conditions, i.e., shrinkage, is necessary in order to produce high $\mu fV/g$ tantalum capacitors.

Flowability of the tantalum powder and green strength (mechanical strength of pressed unsintered powder pellets) are also important characteristics for the capacitor producer in order to provide efficient production. The flowability of the agglomerated tantalum powder is essential to proper operation of automatic pellet presses. Sufficient green strength permits handling and transport of a pressed product, e.g., pellet, without excessive breakage.

A 'pellet', as the term is used herein, is a porous mass or body comprised of tantalum particles. Green strength is a measure of a pellet's mechanical strength. The term 'pressability' describes the ability of a tantalum powder to be pressed into a pellet. Tantalum powder that forms pellets that retain their shape and have sufficient green strength to withstand ordinary processing/manufacturing conditions without significant breakage have good pressability.

Currently, tantalum powders suitable for use in high performance capacitors are produced by several methods. One powder production method involves chemical reduction, e.g., sodium reduction of potassium fluorotantalate, $K_2TaF_7$. In another method, powder is produced by hydriding a melted (typically arc melted or electron beam melted) tantalum ingot, milling the hydrided chips, and dehydriding.

As discussed above, the $\mu fV/g$ of a tantalum pellet is a function of the specific surface area of the sintered powder. Greater net surface area can be achieved, of course, by increasing the quantity (grams) of powder per pellet; but, cost and size considerations have dictated that development be focused on means to increase the specific surface area of tantalum powder.

One of the methods proposed for increasing the specific surface area of tantalum powder is flattening the powder particles into a flake shape.

Efforts to further increase specific surface area by making thinner tantalum flakes have been hindered by concomitant loss of processing characteristics. For example, several of the major deficiencies of very thin tantalum flake are poor flow characteristics, poor pressability and low green strength and low forming voltages.

OBJECTS AND SUMMARY OF THE INVENTION

It is an object of this invention to provide a method for making flaked tantalum powder having a Scott density greater than about 18 g/in$^3$.

It is another object of this invention to provide a flaked tantalum powder wherein at least about 90% of the flakes have no dimension greater than about 55 micrometers and the individual flakes have a substantially uniform cross section.

It is another object of this invention to provide a flaked tantalum powder having a Scott density greater than about 18 g/in$^3$ suitable for use in economical high speed processes for the manufacture of tantalum capacitors.

It is another object of this invention to provide an agglomerate of flaked tantalum powder that has good flowability and pressability characteristics.

It is another object of this invention to provide flaked tantalum pellets having high green strength.

It is another object of this invention to provide flaked tantalum pellets having reduced sensitivity to sintering temperatures, i.e., pellets that can be sintered over a wide range of temperatures, relative to the prior art, to form an electrode useful in a tantalum capacitor.

It is another object of this invention to provide a tantalum electrode having reduced sensitivity to forming voltages, i.e., dielectric oxides can be formed on the electrodes over a range of voltages.

The present invention provides a method for making flaked tantalum powder that, in agglomerated form, is flowable and pressable comprising the steps of preparing tantalum flakes and reducing the flake size so that the resulting tantalum flake Scott density is greater than about 18 g/in$^3$. In one embodiment at least about 90% of the flakes have no dimension greater than about 55 micrometers, and in another embodiment no greater than about 25 micrometers. Preferably, at least about 90% of the flakes have no dimension greater than about 45 micrometers. The flake may be embrittled, e.g., by hydriding, oxidizing, cooling to low temperatures or like methods to facilitate the flake size reduction step.

The present invention provides a flaked tantalum powder produced from a tantalum flake prepared from tantalum, powder produced by chemical reduction methods. The flaked tantalum powders of this invention have improved processing properties, when agglomerated, including flow properties suitable for high speed manufacturing operations and also have good pressability for forming high green strength pellets. The flaked tantalum powder of the present invention has a Scott density greater than about 18 g/in$^3$ preferably, in the range of about 18 g/in$^3$ to about 60 g/in$^3$. A still more preferred range for the Scott density of the flaked tantalum powder is about 20 g/in$^3$ to about 35 g/in$^3$. A Scott density of about 21 g/in$^3$ is most preferred. Preferably, at least about 90% of the individual tantalum flakes have no dimension greater than about 45 micrometers and as such will pass through a 325 mesh screen.

The present invention also provides an agglomerate of the above-described flaked tantalum powder having improved flowability and pressability characteristics. The agglomerated flaked tantalum powder of this invention may be prepared by any conventional method for preparing agglomerates such as, for example, by heating the tantalum flake, described in the preceding paragraphs, to a temperature of about 1300° to 1600° C. in an inert atmosphere or under vacuum for a period of about 30 to 60 minutes and crushing the resulting product to a size of about 40 mesh (0.015 inch screen opening).

The present invention also provides pellets prepared from the flaked tantalum powder described in the preceding paragraph.

The present invention also provides pellets prepared from the above described agglomerate of flaked tantalum powder.

The present invention also provides a capacitor electrode formed from the pellets described in the preceding paragraphs. In general the capacitors are prepared by sintering the pellets described above and anodizing the sintered pellets.

Other details, objects and advantages of the invention and methods for making and using the same will become apparent from the following detailed description and accompanying Figures. A legend at the bottom of the Scanning Election Micrograph (SEM) Figures gives the voltage, magnification e.g., 400X, and a reference scale in micrometers.

DETAILED DESCRIPTION OF THE INVENTION

Flaked tantalum powder may be prepared by deforming or flattening a granular tantalum powder. It will be appreciated by those skilled in the art that this deformation may be accomplished by conventional mechanical techniques using a ball mill, rod mill, roll mill or the like. The flaked tantalum powder of the present invention can be prepared from such conventionally prepared flaked tantalum powder by reducing the size of the flake particles until a Scott density greater than about 18 g/in$^3$ is achieved. Preferably, this size reduction process may be aided by embrittling the conventional flake by techniques such as hydriding, oxidizing, cooling to low temperatures, or the like, to enhance breakage when reducing the flake particle size by mechanical means such as crushing, or other size reduction processes.

In the present invention flakes are reduced in size without substantially reducing the thickness or tapering the peripheral edges of the flakes. Consequently, in one embodiment the flaked tantalum powder of the invention is characterized by flakes of substantially uniform thickness from edge to edge. Moreover, these flakes may be thicker than prior art flakes of similar size, e.g., at least 90% of the flakes having no dimension greater than about 45 micrometers. The increased thickness is demonstrated by BET nitrogen surface area values which are typically less than about 0.7 m$^2$/g and preferably in the range of about 0.4 m$^2$/g to 0.6 m$^2$/g and more preferably about 0.5 m$^2$/g. An important advantage attributable to the thicker flake is the ability to be anodized to higher forming voltages.

Comparison of FIGS. 1 thru 10 illustrates that the flaked tantalum powder of the present invention is comprised of substantially smaller particles than the prior art flakes. The tantalum flake shown in FIG. 1 was prepared from classified 20×44 micrometer ingot-derived (electron beam melted) tantalum chips. The chips were degassed in a vacuum furnace to remove hydrogen and sieved through a 325 mesh screen. The resulting material was then milled in a vibrating ball mill for 10 hours to flatten the chips into flake. This flake was acid leached first in a HCl/HNO$_3$ mixture and then in HF to remove metallic impurities. The resulting flake which had a Scott density of 10.8 g/in$^3$ was heat treated at 1600° C. for 30 minutes to produce an agglomerated material which was then jaw crushed to 40 mesh sized agglomerates having a Scott density of 13.4 g/in$^3$.

Figure 2:
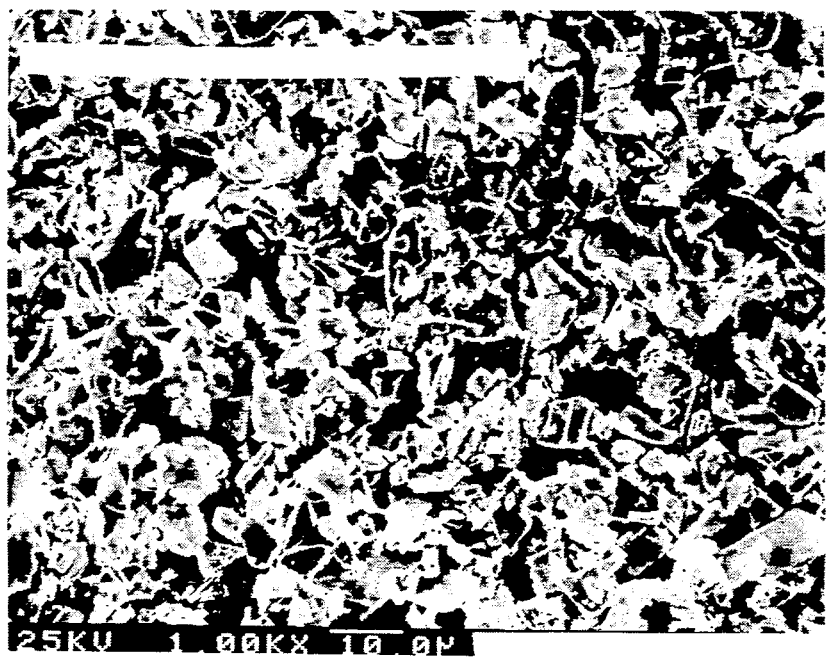
FIG. 2 is a SEM at a magnification of 1000X, of an ingot-derived flaked tantalum powder having a Scott Density of 59.8 g/in$^3$ prepared in accordance with the present invention.

The flaked tantalum powder shown in FIG. 2 was prepared from ingot-derived (electron beam melted) 325 mesh tantalum chips. The chips were degassed in a vacuum furnace to remove hydrogen and sieved through a 325 mesh screen. The resulting material was milled in a vibrating ball mill for 10 hours to flatten the chips into flake. This flake was acid leached first in a HCl/HNO$_3$ mixture and then in HF to remove metallic impurities. The resulting flake had a BET nitrogen surface area value of 0.38 m$_2$/g and a Scott density in the range of 10 to 15.2 g/in$^3$. This flake was hydrided and subjected to cold isostatic pressing at 30,000 psi to break the flake into smaller pieces which after pressing are in the form of a solid bar. The solid bar was jaw crushed to 60 mesh producing flakes having a BET nitrogen surface area value of 0.54 m$^2$/g and Scott density of 59.8 g/in$^3$.

Figure 1:
FIG. 1 is a SEM at a magnification 1000X, of a prior art ingot-derived flaked tantalum powder having a Scott Density of 13.4 g/in$^3$.

Comparison of the flaked tantalum powder shown in FIGS. 1 (prior art) and 2 (invention) demonstrates that the flake of this invention is comprised of substantially smaller flake particles.

Figure 3:
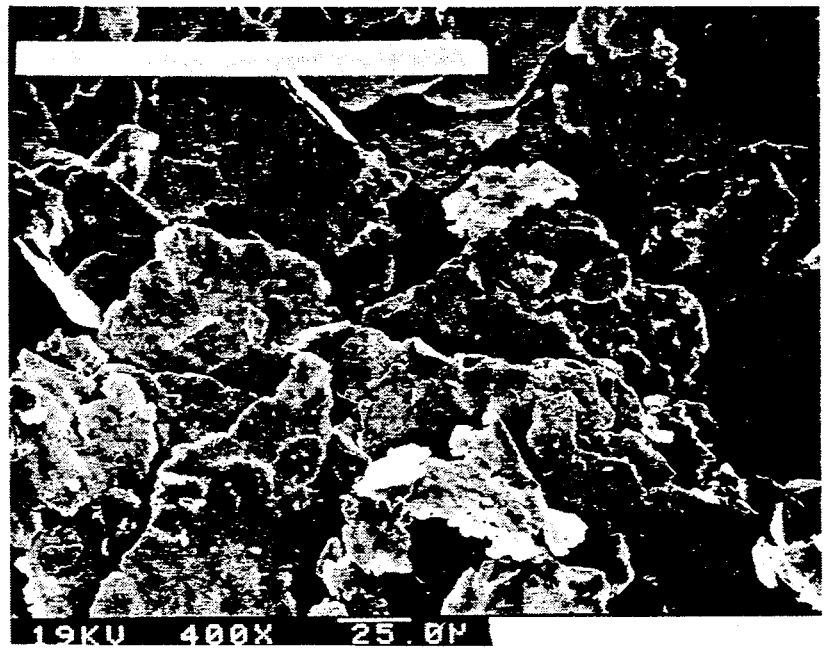
FIG. 3 is a SEM at a magnification of 400X, of a prior art flaked tantalum powder produced in accordance with Example II, specimen H of U.S. Pat. No. 3,647,415 Yano, et al., and which is an example of a tantalum flake that is not produced in accordance with the teachings of that patent.
Figure 7:
FIG. 7 is a SEM at a magnification of 1000X, of the flaked tantalum powder shown in FIG. 3.

The prior art flaked tantalum powder shown in FIGS. 3 and 7 was made from −60 mesh sodium reduced tantalum powder. The powder was deformed to flake shape by milling in a vibratory ball mill for ten hours. The ball milled flakes were acid leached to remove metallic impurities using 15% HCl and 2% HF. This method corresponds to the procedure described in U.S. Pat. No. 3,647,415 for preparing Specimen H in Example II. The Scott density of the resultant flake was 12.54 g/in$^3$ and 90% of the flakes had no dimension larger than 126 micrometers as shown in Table 1.

Figure 4:
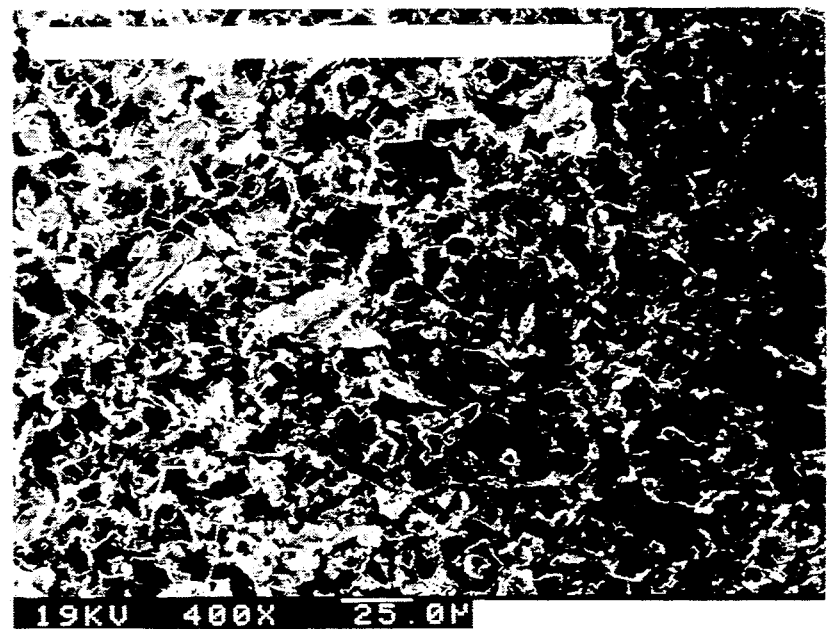
FIG. 4 is a SEM at a magnification of 400X, of a flaked tantalum powder produced by subjecting the flake of FIG. 3 to the process of the present invention.
Figure 8:
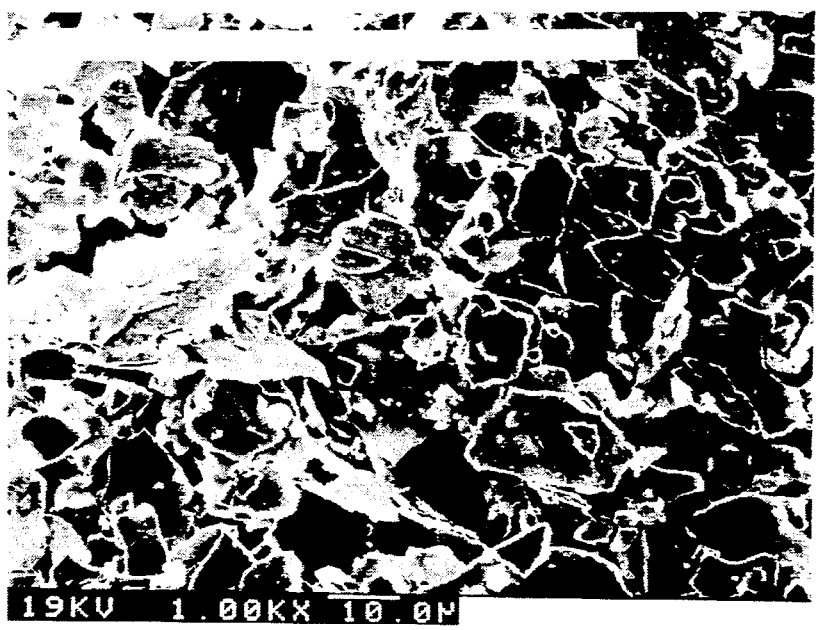
FIG. 8 is a SEM at a magnification of 1000X, of the flaked tantalum powder shown in FIG. 4.

The flaked tantalum powder of this invention shown in FIGS. 4 and 8 was made from −60 mesh sodium reduced tantalum powder. The powder was deformed to flake shape by milling in a vibratory ball mill for ten hours. The ball milled flake was acid leached to remove metallic impurities using 15% HCl and 2% HF. The flake was then heated in a closed vessel until the flake reached about 850° C. Then, however, the heated tantalum flake was hydrided by allowing it to cool to room temperature in the vessel while a positive hydrogen pressure of +5 psi was maintained. The hydrided flake was reduced in size by milling the flake material in a Vortec M1 impact mill, available from Vortec Products Co., Long Beach, Calif., U.S.A., operating at 10,000 rpm. The resultant flake had a Scott density of 21.45 g/in$^3$ and about 90% of the flakes had no dimension greater than about 37 micrometers.

Figure 5:
FIG. 5 is a SEM at a magnification of 400X, of a prior art flaked tantalum powder produced in accordance with Example I, specimen C, of the U.S. Pat. No. 3,647,415 and which is representative of tantalum flake included within the teaching of that patent.
Figure 9:
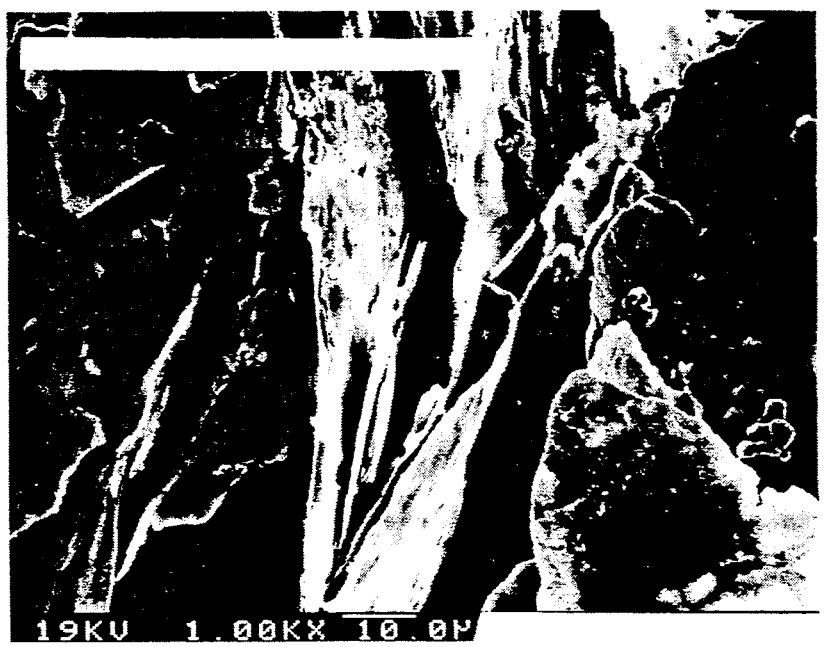
FIG. 9 is a SEM at a magnification of 1000X, of the flaked tantalum powder shown in FIG. 5.

The prior art flaked tantalum powder shown in FIGS. 5 and 9 was also made from −60 mesh sodium reduced tantalum powder. This powder had an absorbed hydrogen content of about 125 ppm. The powder was deformed to flake shape by milling in a vibratory ball mill for six hours. Then the ball milled flake was acid leached to remove impurities using 15% HCl and 2% HF. The resultant flake had a Scott density of 12.7 g/in$^3$ and about 904 of the flakes had no dimension greater than about 131.8 micrometers. This method corresponds to the procedure described in U.S. Pat. No. 3,647,415 for preparing Specimen C in Example I.

Figure 6:
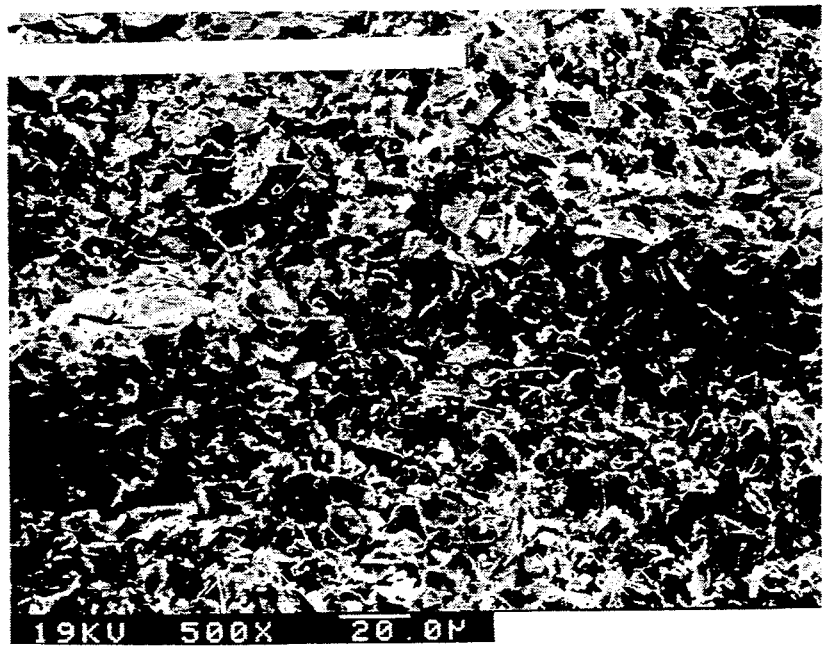
FIG. 6 is a SEM at a magnification of 500X, of a flaked tantalum powder produced by subjecting the flake of FIG. 5 to the process of the invention.
Figure 10:
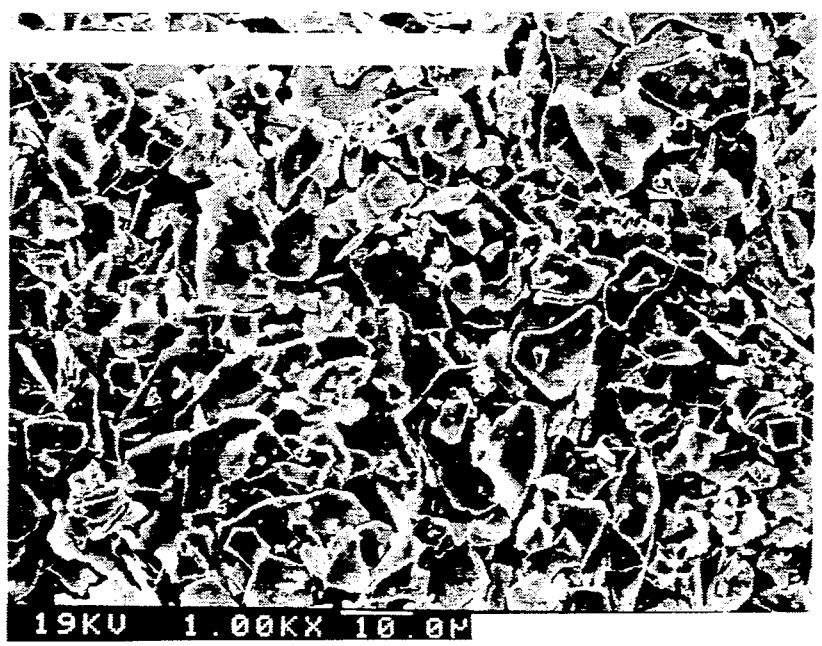
FIG. 10 is a SEM at a magnification of 1000X, of the flaked tantalum powder shown in FIG. 6.

The flaked tantalum powder of this invention shown in FIGS. 6 and 10 were made from −60 mesh sodium reduced tantalum powder. The powder was deformed to flake shape by milling in a vibratory ball mill for six hours. The ball milled flake was acid leached to remove metallic impurities using 15% HCl and 2% HF. The flake was then heated in a closed vessel until the flake reached about 850° C. Then, however, the heated flake was hydrided by allowing it to cool to room temperature in the vessel while a positive hydrogen pressure of +5 psi was maintained. The hydrided flake was reduced in size by milling the flake material in a Vortec M1 impact mill operating at 12,500 rpm. The resultant flake had a Scott density of 28.30 g/in$^3$ and about 90% of the flakes had no dimension greater than about 23.2 micrometers.

Figure 11:
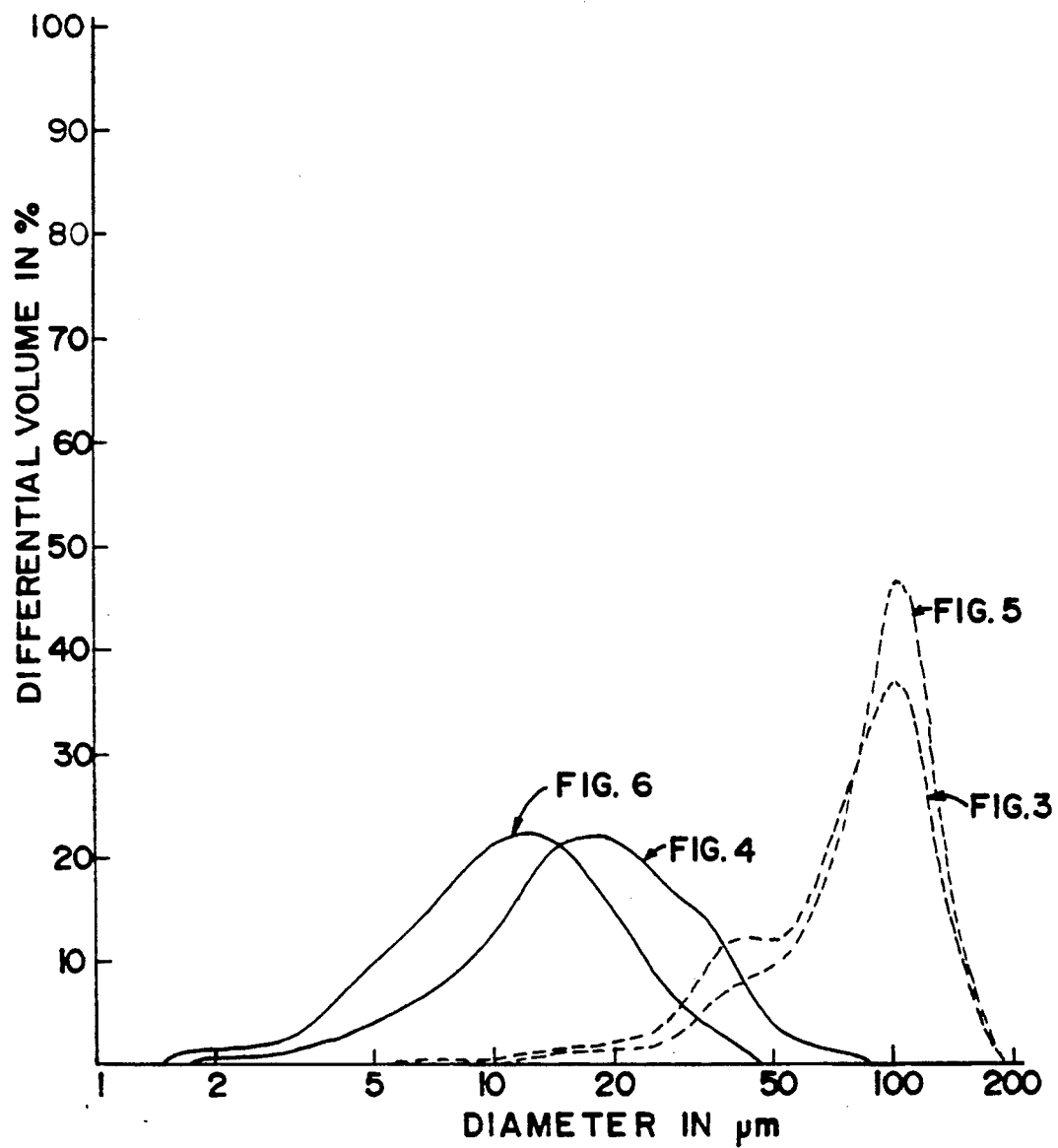
FIG. 11 is a graph showing the particle size distributions of the flaked tantalum powders shown in FIGS. 3 to 10.
Figure 12:
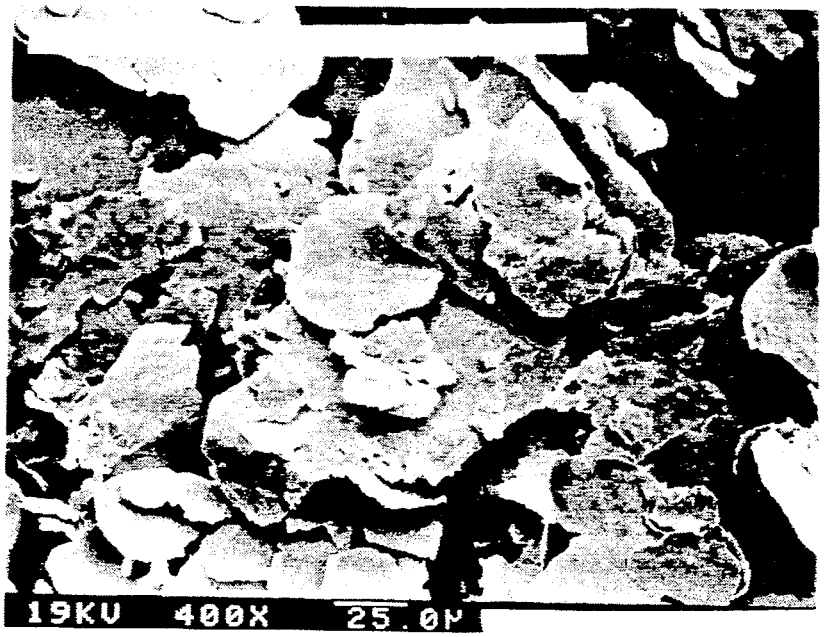
FIG. 12 is a SEM at a magnification of 400X, of the flaked tantalum powder shown in FIG. 3 after agglomeration.

It is apparent from FIG. 11 and the Granulometer data in Table 1 that the particle size of the flake of this invention is substantially smaller than the particle size of the flake of the prior art. It is also clear that the particle size distribution of the flaked powder of the invention is narrower than the particle size distribution of the flake of the prior art.

The screen size distribution, distribution of mean particle size and Scott density of the above-mentioned flaked powders were measured as described below. The results obtained are set forth in Table 1.

Screen Size Distribution

To determine the screen size distribution of flaked tantalum powder, a 325 mesh stainless steel screen having a screen opening of 45 micrometers (ASTME-11 Specification), and a 500 mesh stainless steel screen having a screen opening of 25.4 micrometers both screens having a diameter of 21 centimeters and manufactured by W. S. Tyler Corporation) are cleaned and dried to constant weight. The dried screens are tared to the nearest 0.01 g. The tared screens are stacked with the 325 mesh screen placed above the 500 mesh screen.

A 20 g sample of flake is weighed to the nearest 0.01 g and placed onto the 325 mesh screen. A stream of deionized water from a 0.25 inch internal diameter tube is directed at the sample on the 325 mesh screen at a rate of 2 liters per minute until a total of 6 liters of deionized water is used to facilitate the screening process. The 325 mesh screen is then removed from the stack and deionized water is directed to the sample remaining on the 500 mesh screen in the same manner as described above. During both screening operations the flow of the water is directed against the flake to most effectively cause the flake particles to pass through the screens. Both screens including remaining sample are then rinsed with methanol and dried at a temperature of 70° C. to constant weight.

The dried screens are cooled to room temperature and weighed to the nearest 0.01 g. The weight of the sample retained on the 325 mesh screen and the sample retained on the 500 mesh screen are calculated by subtracting the screen tare weight from the respective final gross weights. The various percentages reported in Table I are calculated from the data obtained by this procedure.

As shown by the data in Table I the flaked tantalum powder of the invention is primarily comprised of particles having a size that will pass through the 500 mesh screen, i.e., particles having no dimension greater than about 25.4 micrometers. On the other hand, the size of the prior art flaked tantalum powder is much larger as demonstrated by the fact that most of the particles thereof were retained on the 325 mesh screen, i.e., particles having a dimension greater than about 45 micrometers.

Distribution of Mean Particle Size

The mean particle size distribution of samples of flaked tantalum powder are determined using a model 715 Granulometer. This is an apparatus designed to make granulometric measurements on pulverulent products suspended in a liquid. By means of a self-contained computer, the apparatus very quickly determines the distribution of mean particle sizes in a range from 0 to 192 micrometers. The sample numbers appearing in Table I (F3 through F6) correspond to the flakes shown in FIGS. 3 through 6. The results of the Granulometer particle size distribution are set forth in Table I and are graphed in FIG. 11. In FIG. 11, the solid lines reference the flaked tantalum powder of the subject invention shown in FIGS. 4 and 6 and the dotted lines reference the prior art flaked tantalum powder shown in FIGS. 3 and 5.

A review of the data in Table 1 reveals that the particle size of the flakes of the present invention are substantially smaller than those of the prior art flakes, which affirms the findings of the screen distribution measurements. Further, the curves of FIG. 11 show that the particle size distribution of the flakes of the present invention are much narrower than those of the prior art flakes.

Scott Density

Scott density is determined with an apparatus comprised of a powder flowmeter funnel, a density cup and stand for the funnel and cup available as a set from Alcan Aluminum Corp., Elizabeth, N.J., U.S.A. The measurement is made by pouring a flake sample through the funnel into the cup (one-cubic-inch nickel plated) until the sample completely fills and overflows the periphery of the cup. Then the sample is leveled-off by means of a spatula, without jarring, so that the sample is flush with the top of the cup. The leveled sample is transferred to a balance and weighed to the nearest 0.1 gram. The Scott density is the weight per cubic inch of the sample.

As Table I shows the flakes of the invention have Scott densities of about twice that of the prior art flakes tested.

TABLE I

| Sample No. | F3 (Prior Art) | F4 | F5 (Prior Art) | F6 |
|---|---|---|---|---|
| Screen Distribution (% Sample retained) | | | | |
| % +325 | 61.40 | 3.34 | 67.88 | 1.59 |
| % −325/500 | 13.08 | 4.19 | 8.45 | 1.24 |
| % −500 | 25.52 | 92.47 | 23.67 | 97.17 |
| Scott Density (g/in$^3$) | 12.54 | 21.45 | 12.70 | 28.30 |
| Granulometer Summary+ | | | | |
| (D) 10%* | 33.5 | 6.7 | 41.6 | 4.6 |
| (D) 50%** | 83.5 | 17.4 | 93.2 | 11.1 |
| (D) 90%*** | 126.5 | 37.0 | 130.8 | 23.2 |

+As measured on Compagnie Industrielle Des Laser, Cilas Alcatel Granulometer Model 715.
*Length in micrometers that is greater than the measured diameter of the smallest 10 percent by volume of the particles in the sample.
**Length in micrometers that is greater than the measured diameter of the smallest 50 percent in volume of the particles in the sample.
***Length in micrometers that is greater than the measured diameter of the smallest 90 percent by volume of the particles in the sample.

Agglomeration

The flaked tantalum powders are agglomerated in any conventional manner in order to provide a product which is suitable for subsequent formation into pellets from which capacitor electrodes can be fabricated. Typically, agglomeration involves heat treatment of the flake in a vacuum or inert atmosphere at temperatures in the range of about 1300° to 1600° C. for periods of time ranging from about 30 to 60 minutes. The specific agglomeration technique utilized herein is described below.

The agglomerates shown in FIGS. 12 through 19 were made utilizing the flakes shown in FIGS. 3, 4, 5 and 6. The flakes of FIGS. 3, 4, 5 and 6 were individually heat treated under vacuum at 1440° C. for 30 minutes and jaw crushed to −40 mesh. The flakes were doped with 100 ppm phosphorus and then subjected to a second heat treatment at 1500° C. for 30 minutes and jaw crushed to −40 mesh. The resulting flakes were deoxidized by blending with 2.5% Mg powder and heating under +3 psi Argon pressure to temperature of 950° C. for 320 minutes. The resulting agglomerates were acid leached, to remove MgO and excess Mg, using 15% HNO and then rinsed and dried.

Figure 13:
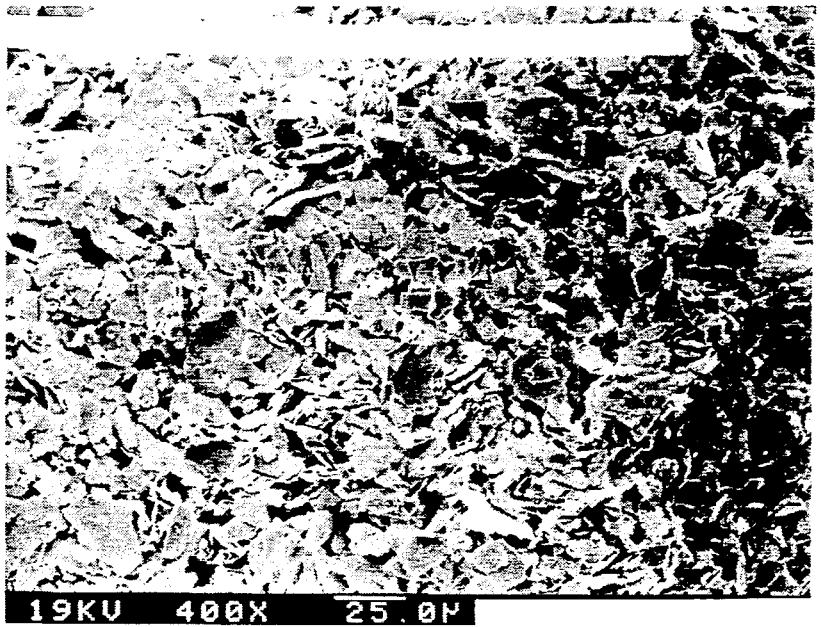
FIG. 13 is a SEM at a magnification of 400X, of the flaked tantalum powder shown in FIG. 4 after agglomeration.
Figure 14:
FIG. 14 is a SEM at a magnification of 400X, of the flaked tantalum powder shown in FIG. 5 after agglomeration.
Figure 15:
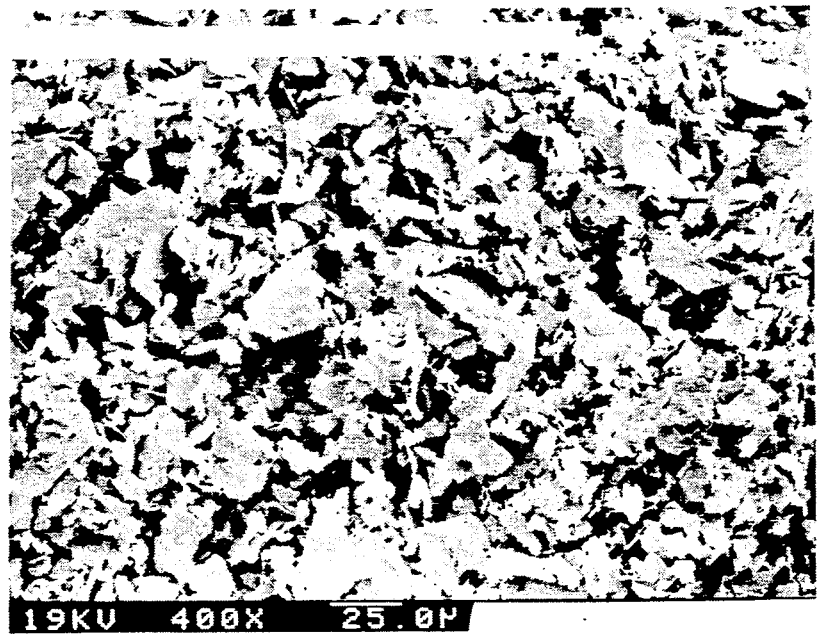
FIG. 15 is a SEM at a magnification of 400X, of the flaked tantalum powder shown in FIG. 6 after agglomeration.
Figure 16:
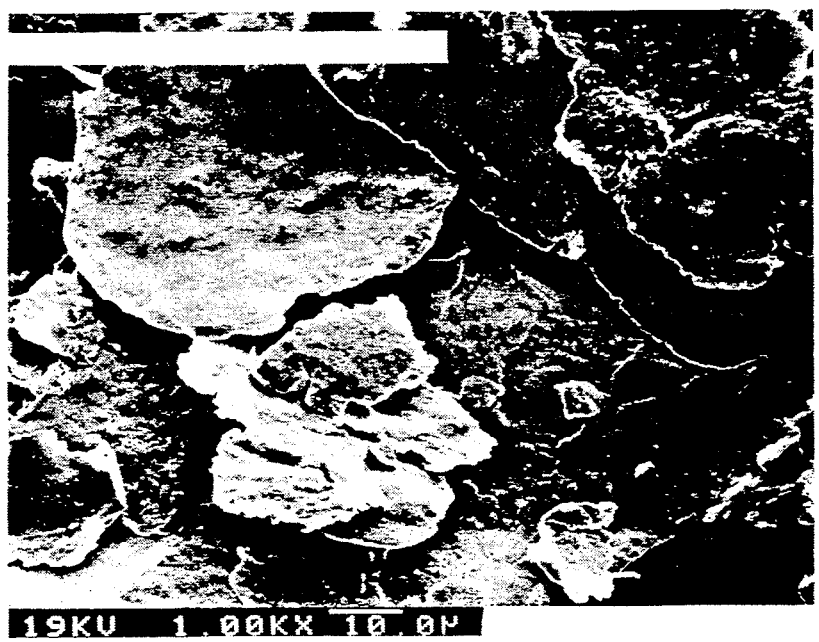
FIG. 16 is a SEM at a magnification of 1000X, of the flaked tantalum powder shown in FIG. 3 after agglomeration.
Figure 17:
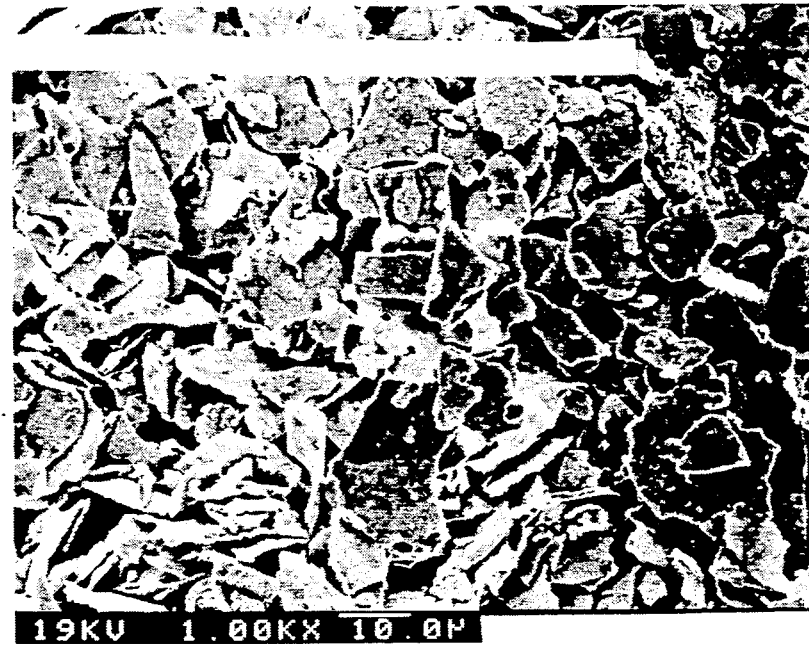
FIG. 17 is a SEM at a magnification of 1000X, of the flaked tantalum powder shown in FIG. 4 after agglomeration.
Figure 18:
FIG. 18 is a SEM at a magnification of 1000X, of the flaked tantalum powder shown in FIG. 5 after agglomeration.
Figure 19:
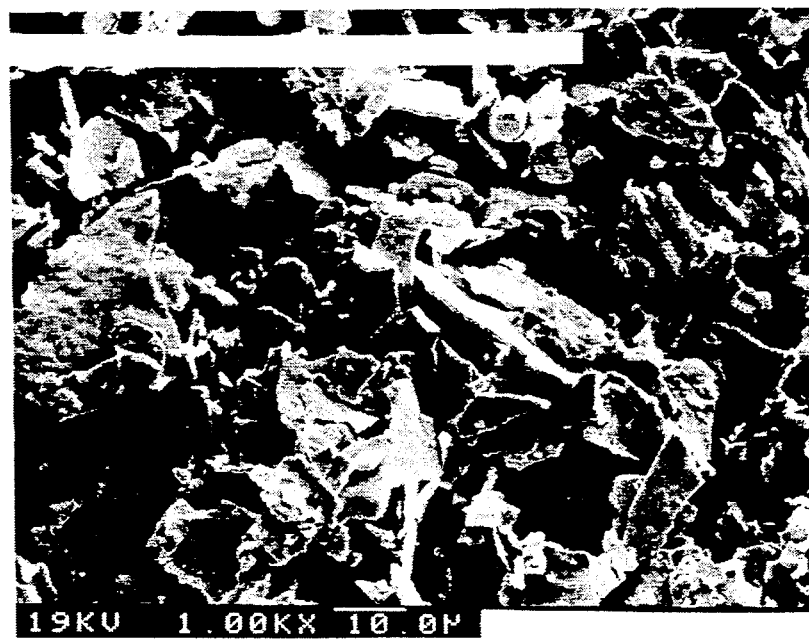
FIG. 19 is a SEM at a magnification of 1000X, of the flaked tantalum powder shown in FIG. 6.

The flow rates of the agglomerates shown in FIGS. 12 through 19 were measured according to ASTM Test Method B213-83. The agglomerates of the invention as shown in FIGS. 13 and 17 flowed at a rate of 0.72 grams per second and the agglomerates of the invention as shown in FIGS. 15 and 19 flowed at 0.84 grams per second. On the other hand, the agglomerates of the prior art as shown in FIGS. 12, 14, 16 and 18 did not flow at all and thus the flow rate could not be measured. Failure to flow is very detrimental since it is impractical to commercially press pellets from agglomerates that do not flow.

Pellet Fabrication and Crush Strength

An agglomerated flaked tantalum powder is compressed in a conventional pellet press without the aid of binders using an imbedded tantalum wire. Two samples of a tantalum powder, one weighing 1.29 g and the other weighing 1.33 g are separately introduced into a die of a pellet press having a diameter of 0.250 inch. The press is set up to press a pellet having a length of 0.330 inch. Utilizing the above weights and lengths an approximate green density of 5.0 g/cc is achieved.

Figure 20A:
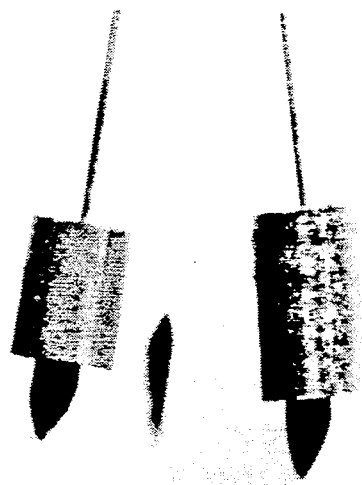
FIGS. 20A and 20B are photographs of pellets pressed from the agglomerated flaked tantalum powder shown in FIGS. 12, 13, 16 and 17.
Figure 20B:
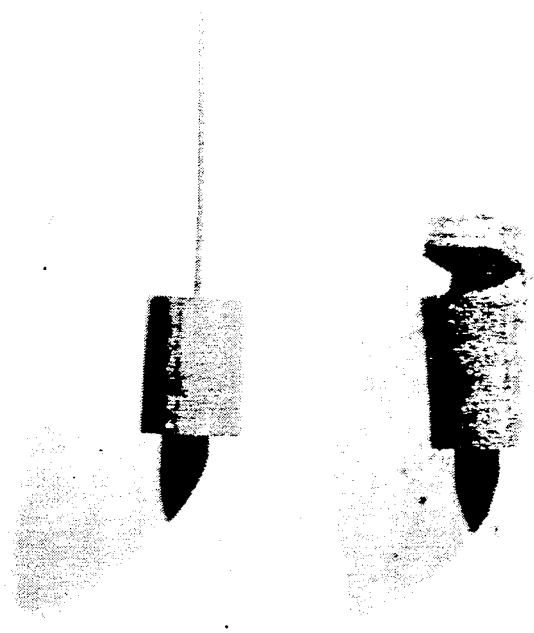
Figure 21A:
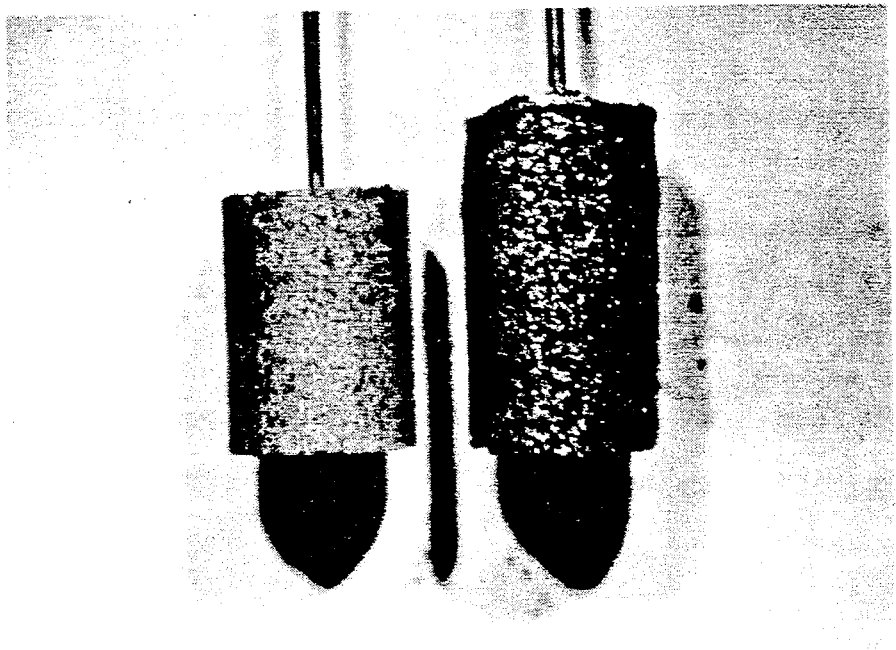
FIGS. 21A and 21B are photographs of pellets pressed from the agglomerated flaked tantalum powder shown in FIGS. 14, 15, 18 and 19.
Figure 21B:
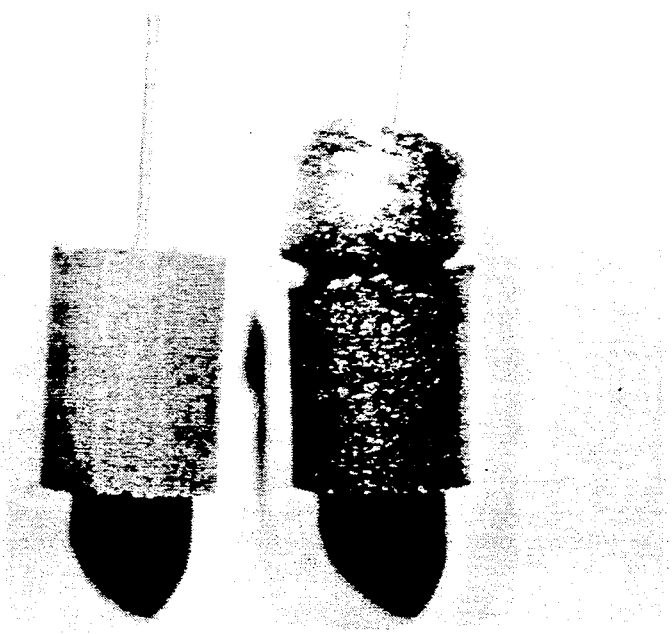

Pressability and green strength improvements exhibited by the flaked tantalum powder of this invention are apparent from the photographs of FIGS. 20 and 21. FIGS. 20 and 21 show pairs of pellets pressed from a flake of the invention in comparison to pellets prepared from the prior art flake. FIG. 20 compares the pellets pressed from the flakes of FIGS. 12 and 13. FIG. 21 compares the pellets pressed from the flakes of FIGS. 14 and 15. In each pair, the pellet on the left is pressed from flake of this invention while the pellet on the right was prepared from the prior art flake.

The pellets prepared with the prior art flakes, expanded when released from the die such that their lengths were irregular and could not be accurately measured. As can be seen from FIGS. 20 and 21 the pellets prepared from prior art flake were also deformed and cracked. In contrast, pellets made from flake of the invention maintained the specified length and were suitable for further testing and processing into anodes. Usable pellets could not be made from the prior art flake tested; whereas, the flake of this invention produced usable pellets which retained the desired shape and have crush strength adequate for utilization in manufacturing tantalum capacitors.

Although we have set forth certain present preferred embodiments of our flaked tantalum powder and methods of making same, it should be distinctly understood that our invention is not limited thereto but may be variously embodied within the scope of the following claims.

We claim:

1. A method for making a flaked tantalum powder, comprising the steps of:
   preparing tantalum flake powder, and
   reducing the flake size by fracturing, without substantially reducing the thickness or tapering the peripheral edges of the flakes, until the powder has a Scott Density greater than about 18 g/in$^3$.

2. The method of claim 1, wherein the flake size is reduced until the Scott density is in the range of about 18 g/in$^3$ to about 60 g/in$^3$.

3. The method of claim 1, wherein the flake size is reduced until the Scott density is in the range of about 20 g/in$^3$ to about 35 g/in$^3$.

4. The method of claim 3 wherein the reduced size flakes have a BET surface area value of about 0.5 m$^2$/g.

5. The method of claim 1, wherein the flake size is reduced until the Scott density is about 21 g/in$^3$.

6. The method of claim 1, wherein at least about 90% of the reduced size flakes have no dimension greater than about 25 micrometers.

7. The method of claim 6, further comprising the step of embrittlement of the flaked tantalum powder prior to the size reduction step.

8. The method of claim 7, wherein the embrittlement step is accomplished by hydriding.

9. The method of claim 6, further comprising the step of agglomerating the reduced size flake.

10. The method of claim 6 wherein the reduced size flakes have a BET surface area value of about 0.4 m$^2$/g to 0.6 m$^2$/g.

11. The method of claim 1, wherein at least about 90% of the reduced size flakes have no dimension greater than about 55 micrometers.

12. The method of claim 11, further comprising the step of embrittlement of the flaked tantalum powder prior to the size reduction step.

13. The method of claim 12, wherein the embrittlement step is accomplished by hydriding.

14. The method of claim 11, further comprising the step of agglomerating the reduced size flake.

15. The method of claim 11, wherein the tantalum flake is prepared from a tantalum powder produced by a chemical reduction process.

16. The method of claim 11, wherein the tantalum flake is prepared from a tantalum ingot.

17. The method of claim 1, wherein at least about 90% of the reduced size flakes have no dimension greater than about 45 micrometers.

18. The method of claim 17, further comprising the step of embrittlement of the flaked tantalum powder prior to the size reduction step.

19. The method of claim 18, wherein the embrittlement step is accomplished by hydriding.

20. The method of claim 17, further comprising the step of agglomerating the reduced size flake.

21. The method of claim 17 wherein the reduced size flakes have a BET surface area value of about 0.5 m$^2$/g.

22. The method of claim 1, wherein the tantalum flake is prepared from a tantalum powder produced by a chemical reduction process.

23. The method of claim 1, wherein the tantalum flake is prepared from a tantalum ingot.

24. The method of claim 1 wherein the reduced size flakes have a BET surface area value of about 0.4 m$^2$/g to 0.6 m$^2$/g.

* * * * *